US006961304B1

(12) United States Patent
Rudrapatna et al.

(10) Patent No.: US 6,961,304 B1
(45) Date of Patent: Nov. 1, 2005

(54) DYNAMIC REASSIGNMENT OF CODE SPACE AMONG MULTIPLE MODES OF OPERATION

(75) Inventors: Ashok N. Rudrapatna, Basking Ridge, NJ (US); Mehmet Oguz Sunay, Summit, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 785 days.

(21) Appl. No.: 09/660,094

(22) Filed: Sep. 12, 2000

(51) Int. Cl.[7] .......... H04J 11/00
(52) U.S. Cl. .......... 370/209; 370/331; 370/335; 455/442; 455/444
(58) Field of Search .......... 370/208, 209, 370/319, 320, 335, 342, 441, 437, 479, 331; 455/436, 437, 439, 444, 442

(56) References Cited

U.S. PATENT DOCUMENTS

| | | | | |
|---|---|---|---|---|
| 5,103,459 A * | 4/1992 | Gilhousen et al. | 370/206 |
| 5,218,630 A * | 6/1993 | Patsiokas et al. | 455/450 |
| 5,301,356 A * | 4/1994 | Bodin et al. | 455/436 |
| 5,410,568 A * | 4/1995 | Schilling | 370/342 |
| 5,542,093 A * | 7/1996 | Bodin et al. | 370/335 |
| 5,590,177 A * | 12/1996 | Vilmur et al. | 455/436 |
| 5,649,292 A * | 7/1997 | Doner | 455/447 |
| 5,722,072 A * | 2/1998 | Crichton et al. | 455/437 |
| 5,907,545 A * | 5/1999 | Arai et al. | 370/342 |
| 6,021,309 A * | 2/2000 | Sherman et al. | 455/12.1 |
| 6,173,005 B1 * | 1/2001 | Kotzin et al. | 375/141 |
| 6,208,615 B1 * | 3/2001 | Faruque et al. | 370/209 |
| 6,360,098 B1 * | 3/2002 | Ganesh et al. | 455/436 |
| 6,526,036 B1 * | 2/2003 | Uchida et al. | 370/342 |
| 6,611,506 B1 * | 8/2003 | Huang et al. | 370/329 |
| 6,628,630 B1 * | 9/2003 | Nagase | 370/331 |
| 6,804,216 B1 * | 10/2004 | Kuwahara et al. | 370/335 |

FOREIGN PATENT DOCUMENTS

| | | | |
|---|---|---|---|
| EP | 1 035 676 A1 | 9/2000 | H04J 11/00 |
| WO | WO 95/03652 | 2/1995 | H04B 7/26 |
| WO | WO 98/35514 | 8/1998 | H04Q 7/22 |
| WO | WO 00/24146 | 4/2000 | H04J 11/00 |
| WO | WO 01/30105 A1 | 4/2001 | H04Q 7/38 |

* cited by examiner

*Primary Examiner*—Chau Nguyen
*Assistant Examiner*—Joshua Kading

(57) ABSTRACT

The code space associated with the communication system is divided into at least two subspaces where each subspace is assigned to a different mode of operation. In one mode, such as a voice mode, each user is given full time access to a portion of the subspace associated with that mode of operation. In a second mode, such as a data mode, each user uses the entire subspace associated with that mode on a time shared basis. Additionally, in-sector handoffs from one Walsh code to another are used to more efficiently distribute the code space.

18 Claims, 2 Drawing Sheets

$$W_1 = [+1]$$

$$W_2 = \begin{bmatrix} +1 & +1 \\ +1 & -1 \end{bmatrix}$$

$$W_{2n} = \begin{bmatrix} W_n & W_n \\ W_n & \overline{W_n} \end{bmatrix}$$

$$W_4 = \begin{bmatrix} +1 & +1 & +1 & +1 \\ +1 & -1 & +1 & -1 \\ +1 & +1 & -1 & -1 \\ +1 & -1 & -1 & +1 \end{bmatrix}$$

DYNAMIC REASSIGNMENT OF CODE SPACE AMONG MULTIPLE MODES OF OPERATION

RELATED APPLICATIONS

Related subject matter is disclosed in the following application filed concurrently herewith and assigned to the same assignee hereof: U.S. patent application entitled "Code Space Sharing Among Multiple Modes of Operation," Ser. No. 09/660,093.

BACKGROUND OF THE INVENTION

1. Field of the Invention

The present invention relates to communications; more specifically, wireless communications.

2. Description of the Related Art

In some wireless communication systems, channels are distinguished using orthogonal codes such as Walsh codes that are assigned from a collection of codes that constitute a code space. Typically each user is given full time access to a subspace of the code space such as one or more Walsh codes until the communication session is ended by, for example, a handoff, a dropped call or an end of call. This type of use of the code space is inefficient in multiple mode operations such as in systems supporting both voice and data users.

SUMMARY OF THE INVENTION

The present invention divides the code space associated with the communication system into two subspaces where each subspace is assigned to a different mode of operation. In one mode, such as a voice mode, each user is given full time access to a portion of the subspace associated with that mode of operation. In a second mode, such as a data mode, each user uses the entire subspace associated with that mode on a time shared basis. Additionally, in-sector handoffs from one Walsh code to another are used to more efficiently distribute the code space.

DETAILED DESCRIPTION

Walsh codes have the distinctive property that higher Walsh space codes can be derived from the lower Walsh space codes.

Figures 1, 2, 3:
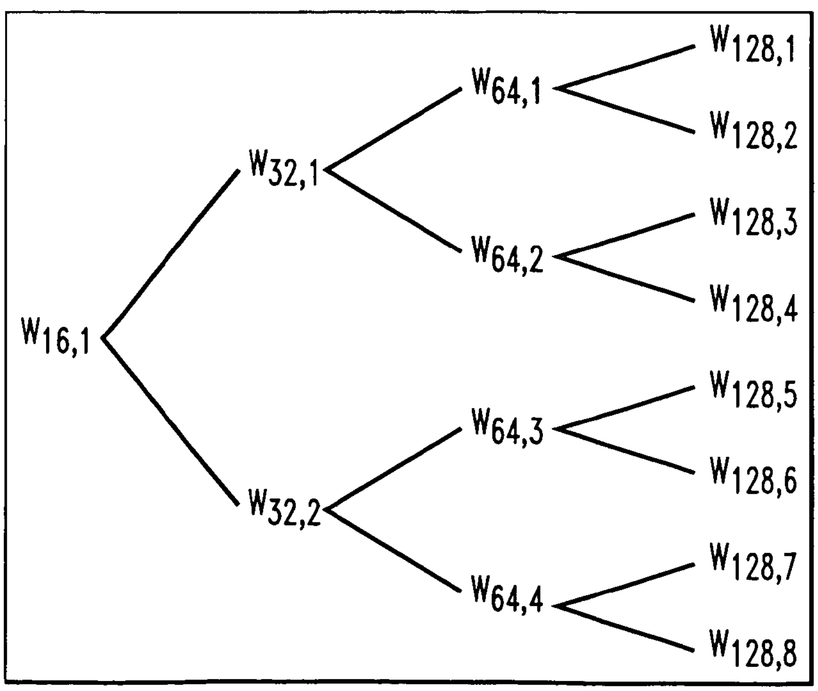
FIG. 1 illustrates Walsh matrices.
FIG. 2 illustrates a Walsh matrix of order 4.
FIG. 3 illustrates the derivation paths for different Walsh spaces.

FIG. 3 illustrates a Walsh matrix of order 1 and order 2, and a Walsh matrix of order 2n. The rows of the matrix are the Walsh codes composing the Walsh space. The relationship between a Walsh matrix of order n and order 2n is a recursive relationship and is used to easily produce larger order Walsh matrices. For example, in creating a Walsh matrix of order 4, the Walsh matrix of order 2 is inserted into the upper left hand corner, the upper right hand corner, and the lower left hand corner of the Walsh matrix of order 4. The bar version of the Walsh matrix of order 2 is inserted into the lower right hand corner of the Walsh matrix of order 4. The bar version of the matrix is formed by taking the logical inverse of each element of the matrix. FIG. 2 illustrates a Walsh matrix of order 4.

Orthogonality across codes from different spaces is possible as long as two codes that are in the same derivation path are not selected simultaneously. Consider FIG. 3. Here, a code from the Walsh space of Walsh-16 is used to derive two codes from the Walsh space of Walsh-32. Likewise, each Walsh code from the Walsh-32 space is used to create two codes from the Walsh-64 space and so on. In the figure $W_{x,y}$ represents the y'th Walsh code form the Walsh space of Walsh-x. Now, from the figure, one can see that, for example, while $W_{32,1}$ and $W_{64,3}$ are orthogonal, $W_{32,1}$ and $W_{64,2}$ are not.

When assigning code space to mode one users, such as voice users, and assigning other code space to mode two users, such as data users, it is desirable to divide the codes in large blocks that originate from a lower order Walsh code such as a 16 symbol code. By assigning the subspaces in groups originating from lower order Walsh codes, a receiver's design is simplified by requiring fewer decoding paths to receive transmissions. For example, in a system using 128 symbol Walsh codes, it is desirable to assign the codes to the subspaces in groups of 8 consecutive codes so that a receiver would only need 16 decoding paths to receive transmissions.

Figure 4:
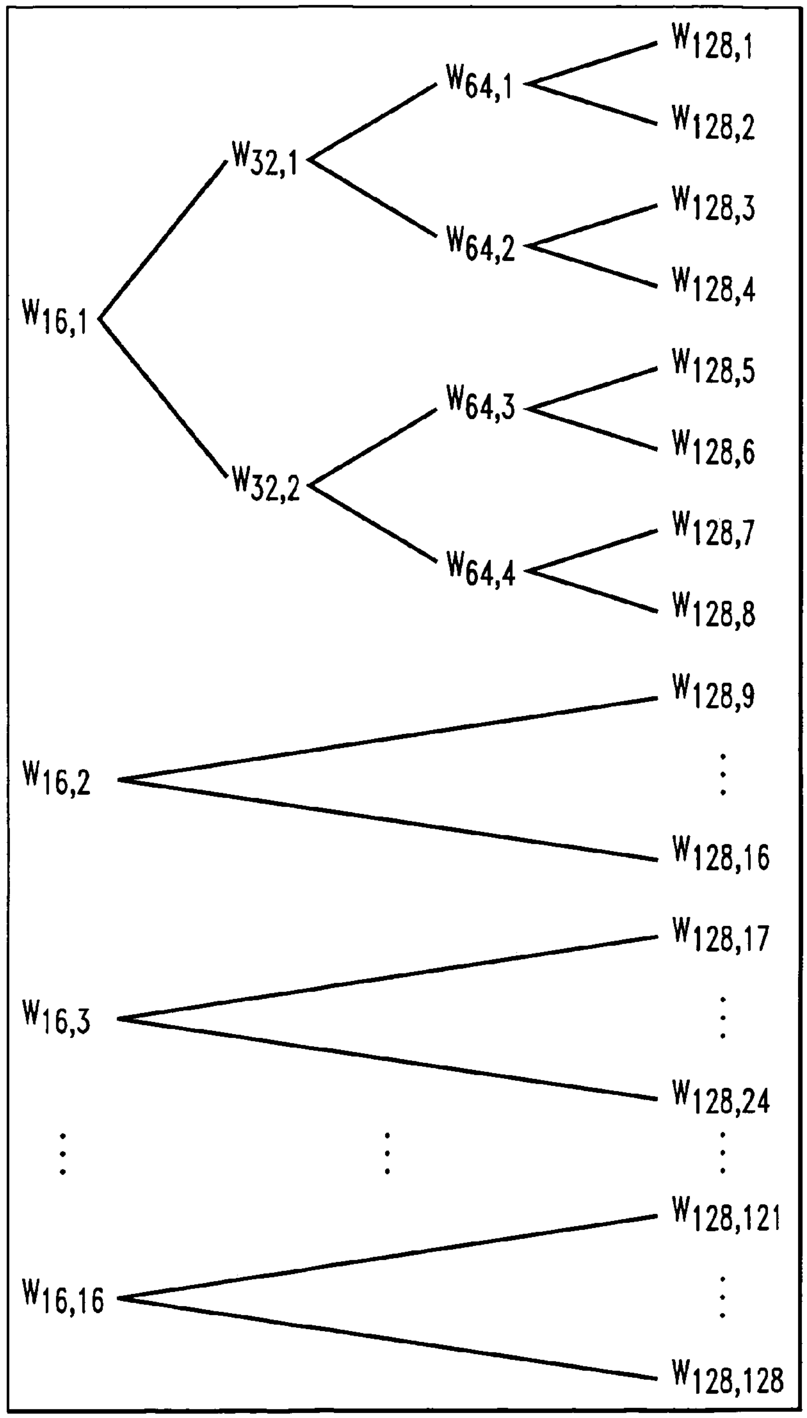
FIG. 4 illustrates the relationship between portions of a 128 Walsh code code space.

In reference to FIG. 4, an initial set of subspace assignmen may be with $W_{128,1}$ through $W_{128,8}$ being assigned to mode 1 operations while the remaining Walsh codes are assigned to the mode 2 (Walsh codes $W_{128,9}$ through $W_{128,128}$). It should be noted that the code spaces have been divided into subspaces originating from 16 symbol Walsh codes which allows a receiver to use 16 decoding paths to receive transmissions. In the mode 1 subspace one or more codes are assigned to each user on a full time basis or until communications are complete with that user. In the mode 2 subspace, all of the codes are assigned to a single user on a time shared or time multiplexed basis. For example, each of n users may use the entire mode 2 code subspace for 1/n of the time.

It is also possible to distribute the codes among the mode 1 and mode 2 subspaces on a dynamic basis. For example, if one code in the mode 1 subspace is not being used, it may be assigned to the mode 2 subspace; however, this is subject to the code from the mode 1 subspace being orthogonal to all of the other codes in the mode 2 subspace. If more codes in the mode 1 subspace are unused, they may be assigned to the mode 2 subspace as well, but once again subject to the codes from the mode 1 subspace being orthogonal to all of the other codes presently in use in the mode 2 subspace. Similarly, unused codes in the mode 2 subspace may be assigned to the mode 1 subspace subject to the codes from the mode 2 subspace being orthogonal to all of the codes presently in use in the mode 1 subspace. Information regarding the current set of code assignments may be transmitted by a base station to users as well as other base stations using communication channels such as control channels or paging channels.

Figure 5:
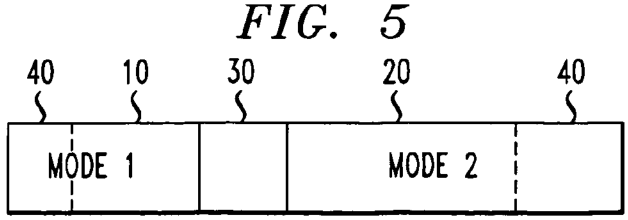
FIG. 5 illustrates the distribution of code space between two modes of operation.

FIG. 5 illustrates the distribution of codes between the mode 1 and mode 2 subspaces. Portion 10 may be assigned to the mode 1 subspace while portion 20 is assigned to the mode 2 subspace. It should be noted that a guardband 30 is provided where codes are not assigned to either subspace. This guardband allows the mode 1 or mode 2 subspaces to expand without immediately removing a code from the other subspace. After some of the codes in the guardband are assigned to one of the subspaces, the guardband is expanded to its original size by taking codes from either subspace as they become available. Additionally, each of the code spaces may be assigned a minimum number of codes indicated by bands 40. These bands guarantee that each of the mode 1 and mode 2 subspaces always have a minimum number of codes for operation.

The utilization of the code space is dynamically changing because user traffic streams (calls or data sessions of either mode-1 or mode-2 type) arrive and depart. This can cause fragmentation of the code space thus unnecessarily blocking user traffic from fully utilizing all available code space. For example and in reference to FIG. 4, consider a situation where only $W_{128,3}$ (from $W_{16,1}$ subspace) and $W_{1282,10}$ (from $W_{16,2}$ subspace) are being used by mode-1 users. In this case, only 14 mode-2 Walsh code ($W_{16}$) space is available for allocation to mode-2 users. However, if the mode-1 $W_{128,10}$ user is transferred to be in the same subspace as $W_{128,3}$ (from $W_{16,1}$ subspace), then one more $W_{16}$ Walsh code ($W_{16,2}$) would be available for mode-2 users, thus improving its performance. To accomplish this an in-sector handoff from one Walsh code to another is executed. An in-sector handoff is a handoff within the same sector of the same cell. As an illustration in the above scenario, a $W_{128,10}$ user would be handed off to $W_{128,2}$. The handoff is executed using the same procedure or a procedure similar to a handoff between different sectors of the same cell or between sectors of different cells. It should be noted that a handoff between Walsh codes may also be between different sectors of the same cell or between sectors of different cells.

The invention claimed is:

1. A method for partitioning code space in a communication system, comprising the steps of:

dividing a code space into at least two subspaces, the at least two subspaces comprising at least one first subspace and at least one second subspace, where codes in the at least one first subspace are assigned to at least one user at a time for a communication session and where all of the codes in the at least one second subspace are assigned to one user;

assigning a first code to a user currently using a second code in one of the at least two subspaces; and performing an in-sector handoff of the user from the second code to the first code.

2. The method of claim 1, further comprising the step of assigning the second code to a different one of the at least two subspaces.

3. The method of claim 2, wherein the user is using the second code in the at least one first subspace.

4. The method of claim 1, wherein the at least one first subspace is used for voice communication.

5. The method of claim 1, where in the at least one second subspace is used for data communication.

6. A method for partitioning code space in a communication system, comprising the steps of:

dividing a code space into at least two subspaces, the at least two subspaces comprising at least one first subspace and at least one second subspace, where codes in the at least one first subspace are assigned to at least one user at a time for a communication session and where all of the codes in the at least one second subspace are assigned to one user;

assigning a first code to a user currently using a second code in one of the at least two subspaces;

handing off the user from the second code to the first code; and assigning the second code to a different one of the at least two subspaces.

7. The method of claim 6, wherein the user is using the second code in the at least one first subspace.

8. The method of claim 6, wherein the at least one first subspace is used for voice communication.

9. The method of claim 6, where in the at least one second subspace is used for data communication.

10. A method for partitioning code space in a communication system, comprising the steps of:

dividing a code space into at least two subspaces, the at least two subspaces comprising at least one first subspace and at least one second subspace, where codes in the at least one first subspace are assigned to at least one user at a time for a communication session and where all of the codes in the at least one second subspace are assigned to one of a plurality of users on a time shared basis;

assigning a first code to a user currently using a second code in one of the at least two subspaces;

handing off the user from the second code to the first code; and assigning the second code to a different one of the at least two subspaces.

11. The method of claim 10, wherein the user is using the second code in the at least one first subspace.

12. The method of claim 10, wherein the at least one first subspace is used for voice communication.

13. The method of claim 10, where in the at least one second subspace is used for data communication.

14. A method for partitioning code space in a communication system, comprising the steps of:

dividing a code space into at least two subspaces, the at least two subspaces comprising at least one first subspace and at least one second subspace, where codes in the at least one first subspace are assigned to at least one user at a time for a communication session and where all of the codes in the at least one second subspace are assigned to one of a plurality of users on a time shared basis;

assigning a first code to a user currently using a second code in one of the at least two subspaces; and performing an in-sector handoff of the user from the second code to the first code.

15. The method of claim 14, further comprising the step of assigning the second code to a different one of the at least two subspaces.

16. The method of claim 15, wherein the user is using the second code in the at least one first subspace.

17. The method of claim 14, wherein the at least one first subspace is used for voice communication.

18. The method of claim 14, where in the at least one second subspace is used for data communication.

* * * * *